United States Patent
Kim et al.

(10) Patent No.: US 12,419,474 B2
(45) Date of Patent: Sep. 23, 2025

(54) ROBOT VACUUM CLEANER

(71) Applicant: LG ELECTRONICS INC., Seoul (KR)

(72) Inventors: Hwang Kim, Seoul (KR); Sanghoon Han, Seoul (KR); Youngjun Jeon, Seoul (KR); Byungho Yoon, Seoul (KR); Soohyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 623 days.

(21) Appl. No.: 17/787,639

(22) PCT Filed: Oct. 14, 2020

(86) PCT No.: PCT/KR2020/014022
§ 371 (c)(1),
(2) Date: Jun. 21, 2022

(87) PCT Pub. No.: WO2021/132859
PCT Pub. Date: Jul. 1, 2021

(65) Prior Publication Data
US 2022/0408992 A1    Dec. 29, 2022

(30) Foreign Application Priority Data
Dec. 24, 2019 (KR) .................. 10-2019-0174121

(51) Int. Cl.
*A47L 9/28* (2006.01)
*A47L 9/00* (2006.01)
(Continued)

(52) U.S. Cl.
CPC ............. *A47L 9/009* (2013.01); *A47L 9/2852* (2013.01); *A47L 11/4066* (2013.01);
(Continued)

(58) Field of Classification Search
CPC ... A47L 9/00; A47L 9/009; A47L 9/28; A47L 9/2852; A47L 2201/00; A47L 2201/04;
(Continued)

(56) References Cited

U.S. PATENT DOCUMENTS

2004/0262060 A1*  12/2004  Kim ................... A47L 9/009
                                              180/65.51
2013/0081218 A1*   4/2013  Kim ................... A47L 9/009
                                              15/21.1
(Continued)

FOREIGN PATENT DOCUMENTS

JP      07-079890      3/1995
KR      10-0507926     8/2005
(Continued)

OTHER PUBLICATIONS

International Search Report dated Jan. 29, 2021 issued in Application No. PCT/KR2020/014022.
(Continued)

*Primary Examiner* — Keith J Frisby
(74) *Attorney, Agent, or Firm* — KED & ASSOCIATES, LLP

(57) ABSTRACT

The present invention relates to a robot vacuum cleaner comprising sub-wheels having variable rotational positions, the robot vacuum cleaner comprising subframes rotatably attached to main frames to ground the sub-wheels when in a constrained state.

10 Claims, 7 Drawing Sheets

(51) Int. Cl.
*A47L 11/40* (2006.01)
*B62D 61/12* (2006.01)

(52) U.S. Cl.
CPC .......... *A47L 11/4072* (2013.01); *B62D 61/12* (2013.01); *A47L 2201/00* (2013.01); *A47L 2201/04* (2013.01); *B60B 2200/49* (2013.01)

(58) Field of Classification Search
CPC .. A47L 11/40; A47L 11/4063; A47L 11/4066; A47L 11/4072; B60B 33/00; B60B 33/0036; B60B 33/0042; B60B 2200/49; B62D 61/00; B62D 61/02; B62D 61/04; B62D 61/12
USPC ................... 180/209, 8.2; 15/340.1; 280/5.2
See application file for complete search history.

(56) References Cited

U.S. PATENT DOCUMENTS

| | | | | |
|---|---|---|---|---|
| 2014/0166375 | A1* | 6/2014 | Windorfer | A47L 9/2852 180/8.2 |
| 2015/0150429 | A1* | 6/2015 | Yoo | A47L 11/4011 173/4 |
| 2016/0081525 | A1* | 3/2016 | Kim | B60B 15/263 15/340.1 |
| 2017/0209015 | A1 | 7/2017 | Liu et al. | |
| 2017/0238778 | A1* | 8/2017 | Kim | B62D 61/12 |
| 2019/0008344 | A1* | 1/2019 | Kim | A47L 9/2826 |
| 2021/0161342 | A1* | 6/2021 | Kim | A47L 11/4072 |

FOREIGN PATENT DOCUMENTS

| | | | |
|---|---|---|---|
| KR | 10-2015-0065134 | 6/2015 | |
| KR | 10-2015-0107234 | 9/2015 | |
| KR | 10-2018-0079068 | 7/2018 | |
| WO | WO-2021066222 A1 * | 4/2021 | ............. A47L 9/009 |

OTHER PUBLICATIONS

Korean Notice of Allowance dated Apr. 1, 2021 issued in Application No. 10-2019-0174121 (English translation attached).

* cited by examiner

[FIG. 1]
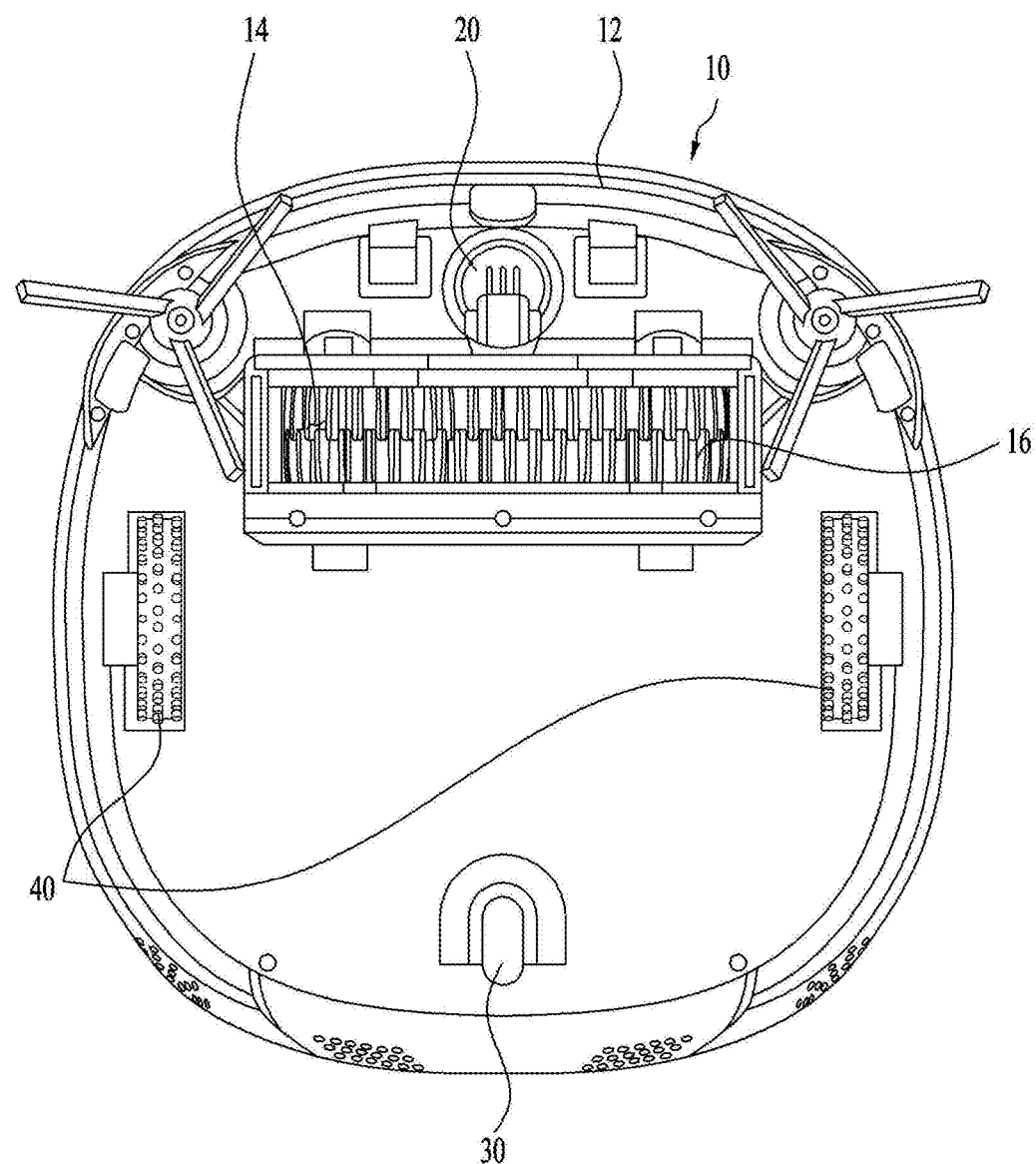

[FIG. 2]
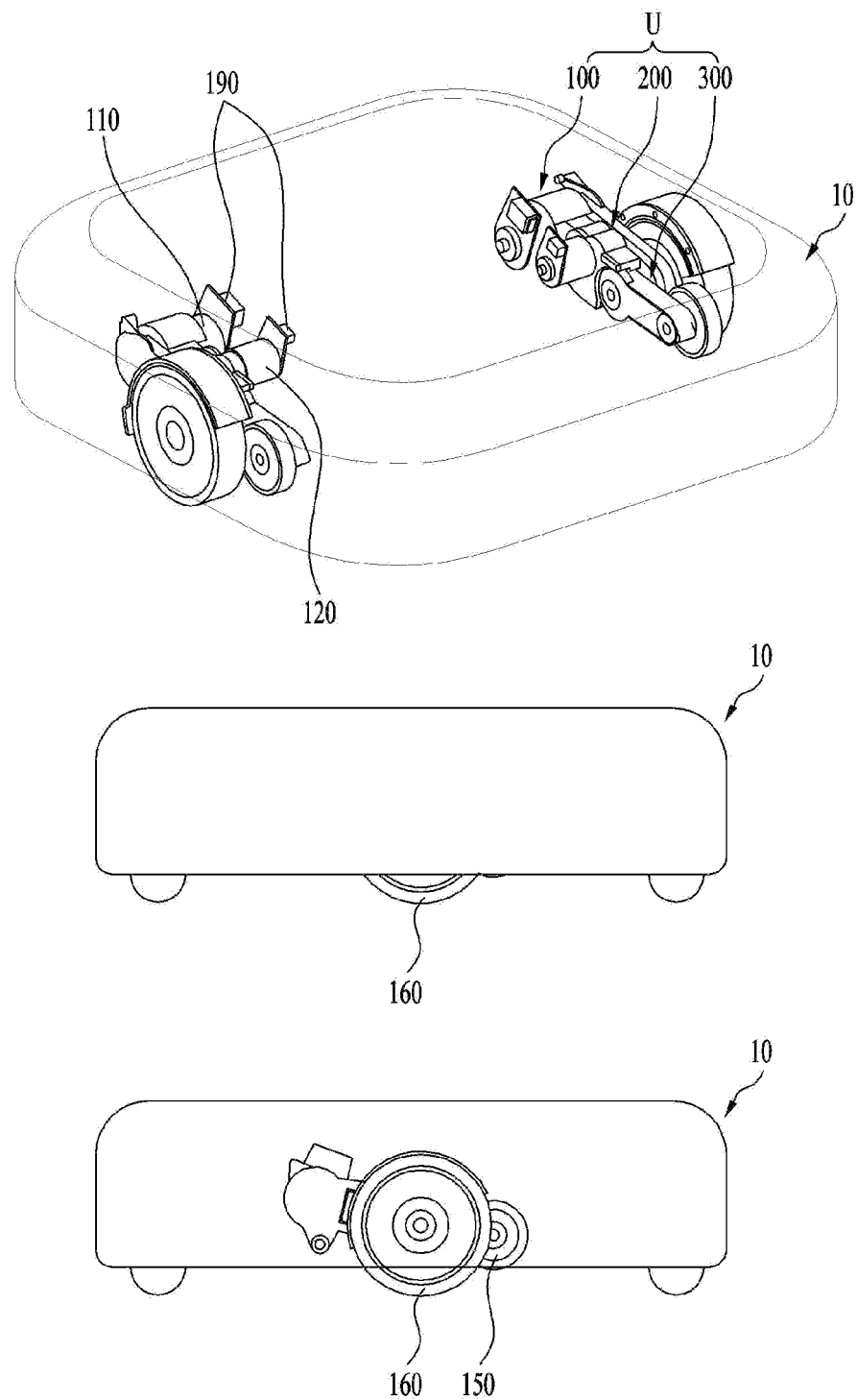

[FIG. 3]
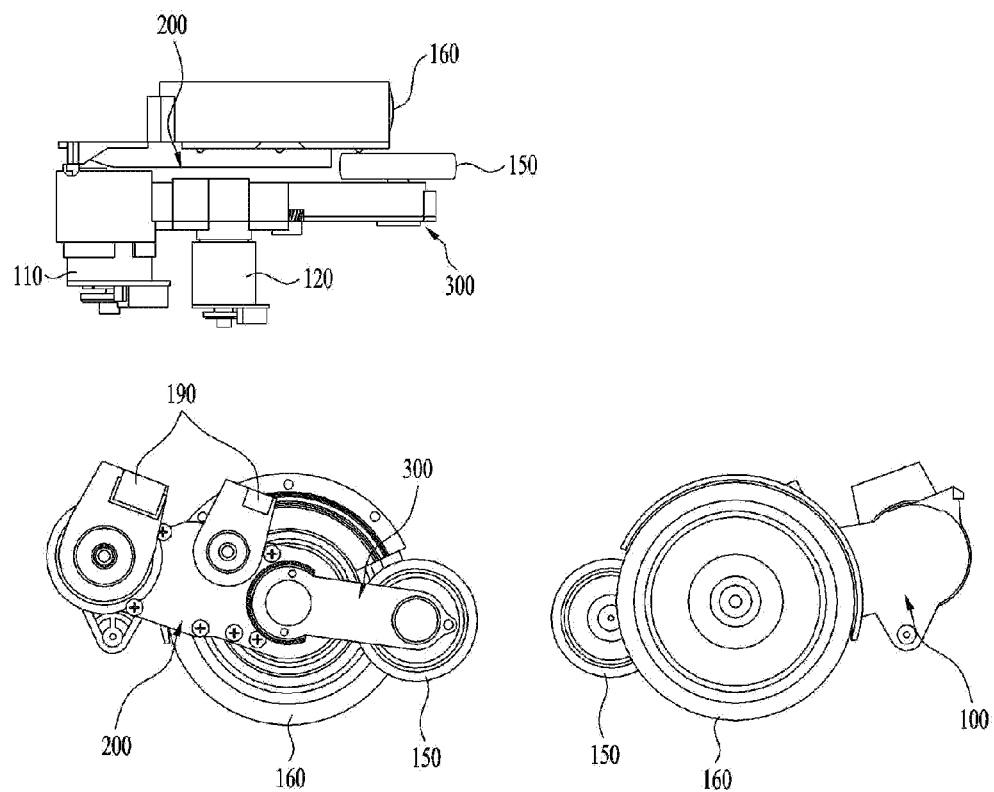

[FIG. 4]
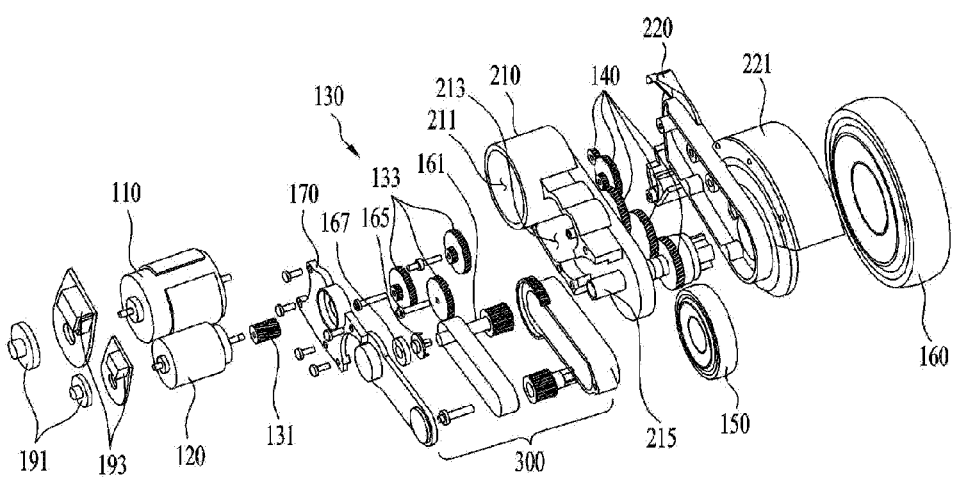

[FIG. 5]
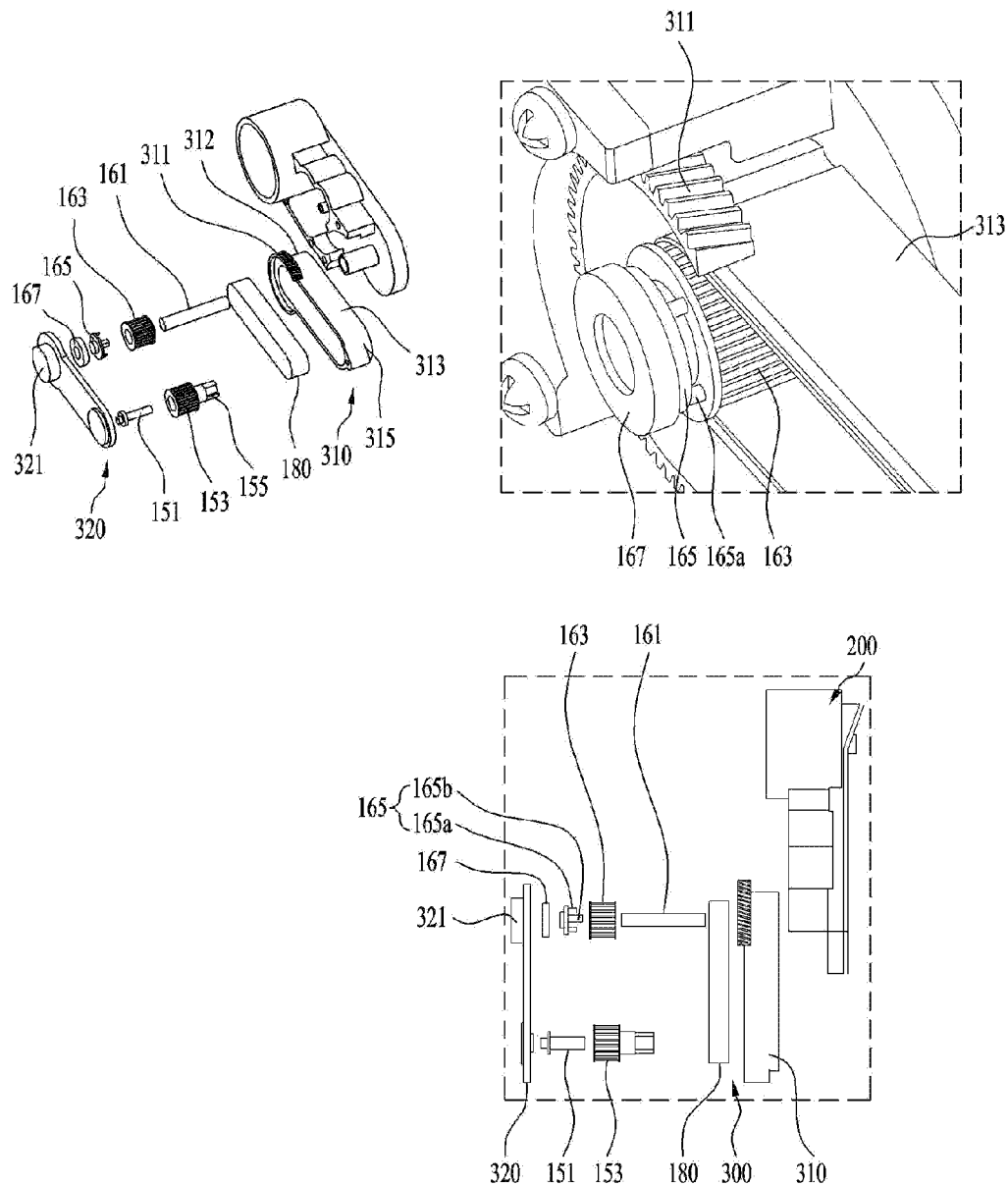

[FIG. 6]
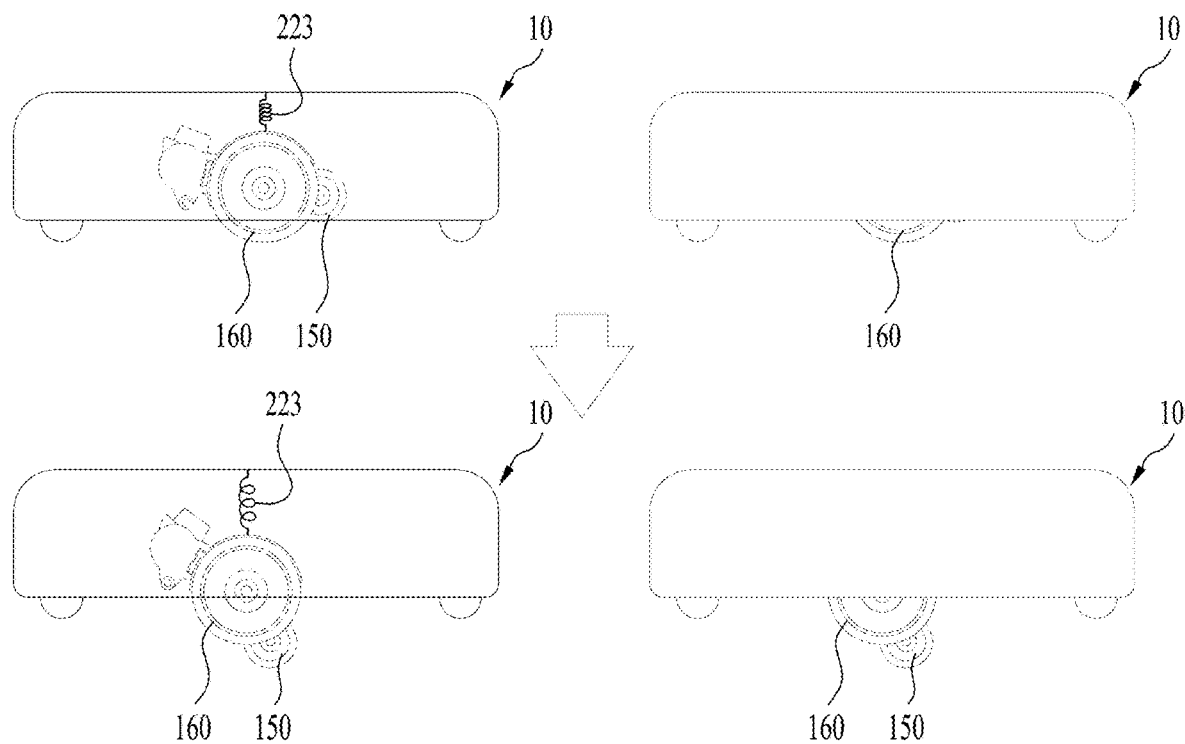

[FIG. 7]
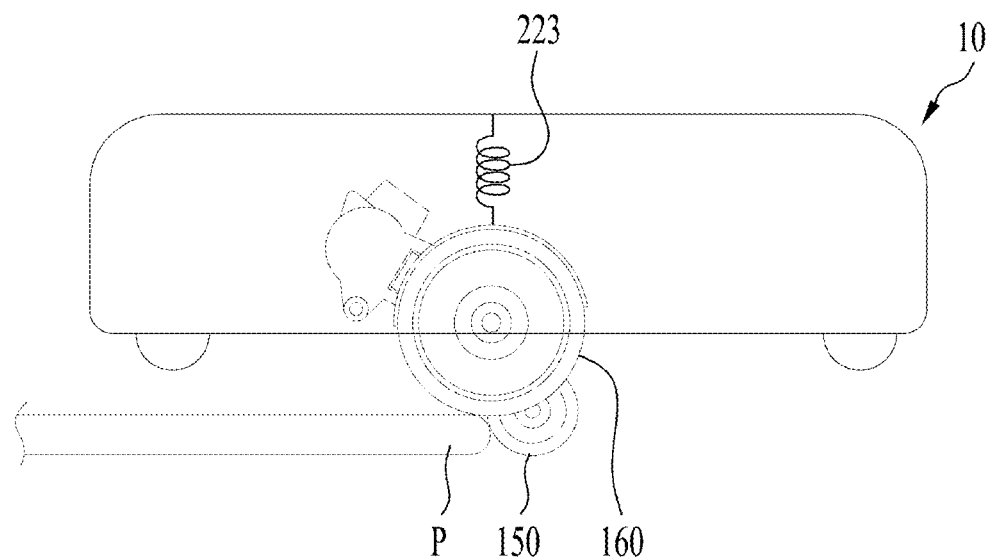

ROBOT VACUUM CLEANER

CROSS-REFERENCE TO RELATED PATENT APPLICATIONS

This application is a U.S. National Stage Application under 35 U.S.C. § 371 of PCT Application No. PCT/KR2020/014022, filed Oct. 14, 2020, which claims priority to Korean Patent Application No. 10-2019-0174121, filed Dec. 24, 2019, whose entire disclosures are hereby incorporated by reference.

TECHNICAL FIELD

The present disclosure relates to a robot cleaner to improve the driving performance.

BACKGROUND ART

In general, a robot cleaner is a device that automatically cleans an area to be cleaned by suctioning foreign substances such as dust from a floor surface while driving the area to be cleaned without a user's manipulation.

FIG. 1 is a diagram illustrating a bottom side of a general robot cleaner. Referring to FIG. 1, a robot cleaner consists of a body 10 defining an exterior, a component for moving the body 10, a component for suctioning foreign materials from a floor, and a component for sensing an area to be cleaned.

In a lower part of the robot cleaner, a suction nozzle for suctioning foreign substances from a floor is provided. The suction nozzle includes a nozzle case immovably fixed to the cleaner body, a suction port 14 formed in a bottom side of the nozzle case to suck foreign materials, and an agitator 16 rotatably provided in the suction port 14 to sweep up foreign materials such as dust and the like stacked on the floor.

Although not shown in FIG. 1, the robot cleaner includes a component for sensing an area to be cleaned. The robot cleaner detects an obstacle located in the area to be cleaned, and drives by climbing over or avoiding the obstacle. The robot cleaner may measure a distance between the obstacle and the robot cleaner to detect the obstacle. That is, the robot cleaner may include a distance sensor. The distance sensor may measure the distance by measuring a time taken to receive a reflective wave from the obstacle after transmitting a medium to the obstacle. In addition, infrared, ultrasonic waves, and/or both infrared rays and ultrasonic waves may be used as the medium.

The robot cleaner includes a wheel 40 to move the body 10. The wheel 40 is positioned on each of the left and right sides of a bottom side of the robot cleaner to support the body 10 and simultaneously move or rotate it back and forth. In addition, a front auxiliary wheel 20 located at a front portion of the bottom side and a rear auxiliary wheel 30 located at a rear portion of the bottom side are included to assist rotation of the body 10.

The wheel 40 located on the left side of the bottom side and the wheel 40 located on the right side of the bottom side may be driven independently from each other. When each of the wheels 40 rotates in the same direction, the body 10 is driven forward or backward. When the wheels 40 rotate in different directions, respectively, the body 10 rotates.

The front auxiliary wheel 20 and the rear auxiliary wheel 30 are provided to be freely rotated in a horizontal direction with respect to the body 10, and an inclined portion 12 disposed at the forefront of the body 10 guides the body 10 when the body 10 goes up a step difference.

In this way, the robot cleaner includes a component for sensing an area to be cleaned, a component for moving the robot cleaner according to the detected area, and a component for cleaning an area to be cleaned according to the movement of the robot cleaner.

However, as the robot cleaner drives through the area to be cleaned, a top portion of the robot cleaner is caught in a narrow gap of an obstacle, a backside of the robot cleaner is caught by a structure or groove on a floor, or the wheel of the robot cleaner is lifted, so there occurs a state in which driving is impossible (hereinafter, such a state will be referred to as a constrained state).

In case of the constrained state, a position of a wheel is changed and grounded in a manner of projecting the wheel spinning with no traction by coupling an elastic member to a robot cleaner of the related art. However, since the elastic force of the elastic member is used, sufficient grip may not be obtained, and even if the wheel is grounded, normal driving may not be available due to being caught in an obstacle.

DISCLOSURE

Technical Tasks

One object of the present disclosure is to provide a robot cleaner obtaining a sufficient grip force in case of a constrained state.

Another object of the present disclosure is to provide a robot cleaner including a subframe rotating without interference with a main wheel in a constrained state.

Technical Solutions

To achieve the above objects or technical tasks, provided is a robot cleaner according to one embodiment of the present disclosure, the robot cleaner including a sub-wheel that is grounded in case of a constrained state.

The sub-wheel may be located inside a body in cases other than the constrained state.

In one technical aspect of the present disclosure, provided is a robot cleaner including a body defining an exterior, a main wheel moving the body, a main motor providing a driving force to the main wheel, a rotation shaft receiving the driving force from the main motor to rotate the main wheel, a main frame having one side coupled to the main motor and the other side penetrated by the rotation shaft to support the main wheel, a subframe rotatably coupled to the main frame, and a sub-wheel coupled to the subframe to rotate, wherein the subframe may have one side coupled to the rotation shaft and the other side coupled to the sub-wheel to change a position of the sub-wheel.

The main frame may include a first frame having the main motor connected thereto and a second frame having the main wheel mounted thereon and the subframe may be coupled to the rotation shaft in the first frame.

The robot cleaner may further include a main connection gear provided between the first frame and the second frame to transmit the driving force of the main motor to the rotation shaft.

The robot cleaner may further include a first pulley coupled to the rotation shaft at one side of the subframe, a second pulley connected to the sub-wheel at the other side of the subframe, and a belt connecting the first and second pulleys together to transmit the driving force of the main motor to the sub-wheel.

The robot cleaner may further include a sub-motor connected to the first frame to rotate the subframe.

The robot cleaner may further include a sub-connection gear provided in the first frame to rotate the subframe by receiving a driving force from the sub-motor and an elastic member coupled to the main frame to provide an elastic restoring force to the main wheel.

The second frame may include a wheel guide spaced apart from an outer circumferential surface of the main wheel by a prescribed distance and the elastic member may be coupled to the wheel guide.

The first frame may include a motor receiving portion extending from the first frame in a direction away from the second frame to receive the main motor therein.

A distance between the first and second pulleys may be greater than that between the rotation shaft and an outer circumferential surface of the main wheel.

Advantageous Effects

One embodiment of the present disclosure may provide a robot cleaner capable of escaping from a constrained state more smoothly.

One embodiment of the present disclosure may provide a robot cleaner enabling a subframe to avoid interfering with a main frame even if the subframe rotates to escape from a constrained state.

One embodiment of the present disclosure may provide a robot cleaner enabling an elastic member to be coupled to a main frame while a subframe is rotating.

DESCRIPTION OF DRAWINGS

FIG. 1 is a diagram showing a robot cleaner of a related art.

FIG. 2 is a diagram showing a driving unit according to one embodiment of the present disclosure.

FIG. 3 is a diagram showing a driving unit according to one embodiment of the present disclosure, viewed in various directions.

FIG. 4 is an exploded perspective diagram of another driving unit according to one embodiment of the present disclosure.

FIG. 5 is a diagram showing a subframe according to one embodiment of the present disclosure.

FIG. 6 is a diagram showing a state that a robot cleaner according to one embodiment of the present disclosure is in a constrained state.

FIG. 7 is a diagram showing that a robot cleaner according to one embodiment of the present disclosure crosses an obstacle according to an embodiment of the present invention.

BEST MODE FOR DISCLOSURE

Reference will now be made in detail to the preferred embodiments of the present disclosure, examples of which are illustrated in the accompanying drawings, to facilitate those having ordinary skill in the art to implement the disclosure.

In this process, the size, shape, etc. of the components illustrated in the drawings may be exaggerated for clarity and convenience of description. In addition, the terms specifically defined in consideration of the configuration and action of the present disclosure may vary according to the intentions or practices of users and operators.

Terms including an ordinal number such as 'first', 'and/or', 'second', etc. may be used to describe various components, not limiting the components. The terms are used only for the purpose of distinguishing one component from another component. For example, within the scope of rights under the concept of the present disclosure, a first component may be named a second component, and similarly the second component may also be named the first component.

These terms shall be defined and understood based on the contents throughout the present specification.

As described in FIG. 1, in the robot cleaner, the wheels 40 are installed on the left side and the right side respectively based on the front side in which the inclined portion 12 is provided. In case of the constrained state, the wheel 40 is not grounded on a floor surface of the area to be cleaned or spins with no traction due to insufficient grip. In this case, since the wheel 40 is grounded to the floor surface using an elastic member or a force may be applied to the wheel 40 only within an elastic restoring force range of the elastic member, a sufficient grip force may not be obtained. In particular, when the upper part of the robot cleaner is caught and the wheel 40 is spaced apart from the floor surface, it may be difficult to escape from the constrained state even by the elastic member.

Accordingly, in one embodiment of this invention, wheels are provided on left and right sides based on a front side, and sub-wheels are further provided on the left and right sides so as to escape a constrained state.

FIG. 2 is a diagram showing a driving unit U according to one embodiment of the present disclosure. FIG. 3 is a diagram showing a driving unit according to one embodiment of the present disclosure, viewed in top, front and rear directions.

One embodiment of the present invention as a whole will be described with reference to FIG. 2 and FIG. 3.

A driving unit U according to one embodiment of the present disclosure includes a driving part 100 moving a body 10, a main frame 200 receiving a driving force from the driving part 100 and transmitting the driving force to a plurality of wheels, and a subframe 300 for escaping from a constrained state by receiving the driving force.

The driving part 100 includes a main motor 110, a sub-motor 120, a sub-wheel 150, and a main wheel 160.

The main motor 110 provides a driving force to the sub-wheel 150 and the main wheel 160. That is, the sub-wheel 150 and the main wheel 160 receive the driving force from the main motor 110 and rotate. Hence, when the main motor 110 is driven, the sub-wheel 150 and the main wheel 160 rotate irrespective of whether they are grounded to a floor surface. In particular, the sub-wheel 150 may receive the driving force from the main motor 110 and rotate even if the sub-wheel 150 is not in a constrained state.

The main frame 200 is connected to the main motor 110 and receives a driving force from the main motor 110. The main frame 200 having received the driving force from the main motor 100 transmits the driving force to the main wheel 160. Accordingly, the main motor 110 and the main wheel 160 are coupled to the main frame 200.

It is preferable that a rotation shaft of the main motor 110 and a rotation shaft of the main wheel 160 are not shared. That is, the rotation shaft of the main motor 110 and the rotation shaft of the main wheel 160 are provided to be spaced apart from each other. Accordingly, the rotation shaft of the main motor 110 is coupled to one side of the main frame 200, and the rotation shaft of the main wheel 160 is coupled to the other side. This is to enable the motors 110 and 120 to transmit a driving force to both the subframe 300 and the sub-wheel 150 provided in the subframe 300, as will be described in detail later.

The sub-motor 120 is coupled to the main frame 200 to provide a driving force to the sub-frame 300. That is, the main frame 200 is connected to the sub-motor 120 and is connected to the sub-frame 300. The subframe 300 receiving the driving force from the sub-motor 120 rotates based on the main frame 200. In addition, as will be described in detail later, a rotation shaft of the main wheel 150 and a rotation shaft of the subframe 300 are shared. Hence, the subframe 300 rotates based on the rotation shaft of the main wheel 150 penetrating the main frame 200.

As described above, according to one embodiment of the present disclosure, a sub-wheel 150 is further included in the main wheel 160. In addition, the subframe 300 rotates based on one shaft of the main frame 200 to change a position of the sub-wheel 150. Hence, the sub-wheel 150 is grounded to move the body 10 as necessary. In particular, in case of a constrained state, the sub-wheel 150 may escape from the constrained state irrespective of whether the main wheel 160 is grounded.

One embodiment of the present disclosure will be described in detail with reference to FIG. 4 and FIG. 5.

FIG. 4 is an exploded perspective diagram of a driving unit U according to one embodiment of the present disclosure. FIG. 5 is a diagram showing a subframe 300 according to one embodiment of the present disclosure.

Referring to FIG. 4, the driving part 100 includes a measuring part 190.

The measuring part 190 includes an encoder 191 and an encoder board 193 interworking with the main motor 110 and the sub-motor 120 to detect a state and convert signals inputted from the main motor 110 and the sub-motor 120. Hence, the robot cleaner according to one embodiment of the present invention may obtain a state of the robot cleaner by the measuring part 190. For example, it is possible to determine whether the robot cleaner is in a constrained state by comparing a distance to be moved by the robot cleaner with an actual distance to be moved by the robot cleaner according to one embodiment of the present disclosure. Hence, the main motor 110 and the sub-motor 120 are connected to the main frame 200 to provide signals to the measuring part 190 while transmitting a driving force to the wheels 150 and 160 and the sub-frame 300.

The main frame 200 includes a first frame 210 to which the motors 110 and 120 are connected and a second frame 220 to which the main wheel 160 is coupled.

The first frame 210 includes a motor receiving portion 211 extending from the first frame 210 in a direction away from the main wheel 160. The motor receiving portion 211 may have a hollow cylindrical shape and extend from the first frame 210 in a direction away from the main wheel 160. Yet, the present disclosure is not limited thereto, and the motor receiving portion 211 may vary depending on shapes and coupled positions of the motors 110 and 120.

The second frame 220 is provided with a wheel guide 221 spaced apart from an outer circumferential surface of the main wheel 160 by a predetermined distance to guide the main wheel 160. The wheel guide 221 is concentric with the outer circumferential surface of the main wheel 160 and has a cross-section corresponding to a part of a circle having a larger radius of curvature than the outer circumferential surface of the main wheel 160. More specifically, the wheel guide 221 extends parallel to the rotation shaft of the main wheel 160 in the second frame 220 to face the outer circumferential surface of the main wheel 160.

An elastic member 223 providing an elastic restoring force may be coupled to the wheel guide 221. The elastic member 223 is a member that provides an elastic force according to an extension like a spring. One side of the elastic member 223 may be coupled to the wheel guide 221 and the other side may be coupled to the body 10. Hence, a position where the main wheel 160 rotates may be corrected. Yet, a position where the elastic member 223 is coupled is not limited to the wheel guide 221, and may include any position at which the elastic member 223 can be coupled to the main frame 200. Preferably, the elastic member 223 is coupled to the wheel guide 221 having the greatest height from the floor surface among the components of the main frame 200 to provide a sufficient elastic restoring force.

A main connection gear 140 is provided between the first frame 210 and the second frame 220. The main connection gear 140 may include a plurality of spur gears, and receives a driving force from the main motor 110 connected to the first frame 210. The main connection gear 140 receiving the driving force from the main motor 110 transmits the driving force to a main rotation shaft 161 coupled to the main wheel 160 to rotate the main rotation shaft 161. Hence, the main wheel 160 rotates by receiving the driving force from the main motor 110.

The first frame 210 includes a gear receiving portion 213 extending from the first frame 210 in a direction away from the second frame 220. The gear receiving portion 230 extends from the first frame 210 side by side with the main rotation shaft 161, and receives a sub-connection gear 130 inside.

The sub-connection gear 130 decelerates the driving force provided from the sub-motor 120 and then provides the decelerated driving force to the subframe 300. To this end, the sub-connection gear 130 may include a sub-gear 131 coupled to the sub-motor 120 and a plurality of deceleration gears 133 provided to surround the sub-gear 131. In addition, a diameter of each of a plurality of the deceleration gears 133 is formed to be larger than that of the sub-gear 131, whereby the driving force received from the sub-motor 120 may be decelerated and transmitted to the sub-frame 300.

The gear cover 170 is coupled to the gear receiving portion 213, and the sub-connection gear 130 is provided in a space formed by the gear receiving portion 213 and the gear cover 170. That is, the gear receiving portion 213 has one end coupled to the first frame 210 and the other end coupled to the gear cover 170 to form a receiving space inside.

The motor receiving portion 211 and the gear receiving portion 213 are coupled to each other. The motor receiving portion 211 may include a groove formed from an outer circumferential surface toward the space for receiving the motor therein, and the gear receiving portion 213 may be coupled to the motor receiving portion 211 by being seated in the groove formed in the motor receiving portion 211.

Accordingly, the main motor 110 rotates the main wheel 160 by providing a driving force to the main wheel 160. In addition, the sub-motor 120 may rotate the sub-frame 300 by providing a driving force to the sub-frame 300.

Hereinafter, the subframe 300 will be described in detail with reference to FIG. 5.

The first frame 210 includes a main rotation shaft receiving portion 215 to which the main rotation shaft 161 is rotatably coupled. The main rotation shaft receiving portion 215 may extend from the first frame 210 in a direction away from the second frame 220, and may have a hollow cylindrical shape. Hence, the main rotation shaft 161 passes through the first frame 210 and the second frame 220 and is coupled to the main wheel 160.

The main rotation shaft 161 is also coupled to the subframe 300. That is, one side of the main rotation shaft 161 is coupled to the main wheel 160 and the other side thereof is coupled to the subframe 300. Hence, a rotational force of the main rotation shaft 161 is transmitted to the main wheel 160 and the subframe 300.

The subframe 300 includes a third frame 310 extending from the first frame 210 in a direction away from the first frame 210. The third frame 310 extends side by side with an extending direction of the main rotation shaft receiving portion 215. In addition, the third frame 310 includes a first curved portion 312 coupled to the main frame 200 and a second curved portion 315 coupled to the sub-wheel 150, and further includes a planar portion 313 connecting the first curved portion 312 and the second curved portion 315 together.

The first curved portion 312 and the second curved portion 315 are formed to have rotatable components provided inside. Referring to FIG. 4, the first curved portion 312 and the second curved portion 315 may be a part of a hollow cylindrical shape, and thus an arc may be a cross-section. Hence, the first curved portion 312 is provided with a component that receives power from the main rotation shaft 161 inside. In addition, a component for transmitting power to the sub-wheel 150 is provided inside the second curved portion 315.

The planar portion 313 extending from the first curved portion 312 toward the second curved portion 315 includes a pair of planes facing each other in parallel. It is preferable that the length of the planar portion 313 extending from the first curved portion 312 to the second curved portion 315 is formed larger than a radius of the outer circumferential surface of the main wheel 160. This is because, as will be described later, the planar portion 313 should be sufficiently extended to escape from the constrained state.

The third frame 310 includes a sub-rotation gear 311 that receives power from the sub-connection gear 130. The sub-rotation gear 311 may be provided as a spur gear of 100 degrees or more. The sub-rotation gear 311 is coupled to an end portion of the third frame 310 in a direction away from the first frame 210 to rotate the third frame 310. Hence, the sub-motor 120 provides a driving force to the sub-connection gear 130, and the sub-connection gear 130 transmits the received driving force to the sub-rotation gear 311 to rotate the third frame 310. That is, the third frame 310 rotates based on the main rotation shaft receiving portion 215 or rotates based on the main rotation shaft 161.

A first pulley 163 coupled to the main rotation shaft 161 is provided inside the first curved portion 312. The first pulley 163 is fixed to the main rotation shaft 161 and rotates in the same manner as the main rotation shaft 161. To this end, the first pulley 163 is coupled to a transmission part 165.

The transmission part 165 is coupled to an end portion of the main rotation shaft 161 in a direction away from the main wheel 160. That is, one end of the main rotation shaft 161 is coupled to the main wheel 160, and the other end thereof is coupled to the transmission part 165. The transmission part 165 includes a main shaft coupling portion 165b coupled to the main rotation shaft 161 and a coupling projection 165a coupled to the first pulley 163, and the coupling projection 165a and the main shaft coupling portion 165b are configured in a manner of extending from the transmission part 165 toward the main wheel 160. Therefore, the main shaft coupling portion 165b receives the rotational force of the main rotation shaft 161 and transmits the rotational force to the coupling projection 165a, and the coupling projection 165a rotates the first pulley 163.

A sub-rotation shaft 151 coupled to the sub-wheel 150 and a second pulley 153 for transmitting power to the sub-rotation shaft 151 are provided inside the second curved portion 315.

The first pulley 163 and the second pulley 153 are connected together by a belt 180. Accordingly, the first pulley 163 transmits a driving force to the second pulley 153 through the belt 180. In addition, the second pulley 153 transmits a driving force to the sub-rotation shaft 151. A sub-axis coupling part 155 is provided between the sub-rotation shaft 151 and the sub-wheel 150, and as the sub-rotation shaft 151 rotates, the sub-wheel 150 may rotate identically.

The subframe 300 further includes a fourth frame 320 coupled to the third frame 310, and the fourth frame 320 includes a bearing receiving portion 321. Accordingly, a bearing 167 provided in the transmission part 165 to support rotation is coupled to the bearing receiving portion 321.

Accordingly, the subframe 300 is rotated by the sub-motor 120 and receives a driving force from the main motor 110 to rotate the sub-wheel 150. That is, the main motor 110 rotates the main wheel 160 and the sub-wheel 150 to move the body 10, and the sub-motor 120 rotates the sub-frame 300 to change the position of the sub-wheel 150.

Meanwhile, a pair of the driving units U are provided on both sides of the body 10, respectively. For convenience of description, one driving unit U has been described, but the same description applies to the other driving unit U. When a space between a pair of the driving units U is defined as an inside, the subframe 300 is provided to the inside inner than the main frame 200. In addition, the first frame 210 is provided to the inside inner than the second frame 220.

Although the main frame 200 may be provided to an inside inner than the subframe 300, the subframe 300 is preferably provided to an inside inner than the main frame 200. The main frame 200 is configured to support the main wheel 160 and determines a distance between a pair of the main wheels 160. Accordingly, when it is not in a constrained state, it is preferable to promote stability of driving as the distance between a pair of the main wheels 160 further increases.

In addition, it is preferable that the sub-wheel 150 is coupled to one surface of the subframe 300 located in a direction far from the inside thereof. In case of the constrained state, a distance between a pair of the sub-wheels 150 further increases, so that it is able to escape from the constrained state stably.

In addition, it is preferable that the subframe 300 independently rotates inside the main frame 200. In other words, when the subframe 300 is rotated, it is preferable that some components of the main frame 200 do not rotate together in the rotation direction of the subframe 300. If the components outside the subframe 300 rotate together when the subframe 300 rotates, it is more difficult to escape from the constrained state due to the components outside the subframe 300.

Hereinafter, an escape process according to one embodiment of the present disclosure will be described with reference to FIG. 6 and FIG. 7.

The upper part of FIG. 6 is a view illustrating the wheels 150 and 160 when not in a constrained state, and the lower part is a view illustrating the wheels 150 and 160 when in a constrained state.

Referring to FIG. 6, the sub-wheel 150 is positioned higher than the main wheel 160 with respect to a floor surface when not in a constrained state. In this case, the sub-wheel 150 and the main wheel 160 rotate by receiving a driving force from the main motor 110, but the main wheel 160 is grounded to the floor surface but the sub-wheel 150 is not grounded.

In a constrained state, the sub-wheel 150 is positioned lower than the main wheel 160 with respect to the floor surface. In particular, even when the main motor 110 and the main frame 200 rotate and the height of the main wheel 160 from the floor surface is lowered, sufficient grip may not be generated. In this case, the subframe 300 rotates based on the main frame 200, and the position of the sub-wheel 150 is positioned at a height lower than the main wheel 160 with respect to the floor surface. Accordingly, even when the main wheel 160 does not ground to the bottom surface or does not obtain sufficient grip force, the grip force may be obtained through the sub-wheel 150.

FIG. 7 is a view illustrating that a robot cleaner according to one embodiment of the present disclosure is crossing a specific obstacle.

Referring to FIG. 7, an obstacle P has a rod shape having a circular cross section. When a bottom surface of a robot cleaner of a related art touches the obstacle P, the robot cleaner may not proceed and a wheel may spin with no traction. In this case, even if an elastic member applies a force to the wheel or the obstacle P, it may be difficult to escape from a constrained state. This is because a structure of the obstacle P itself is a structure that cannot generate sufficient grip force.

Accordingly, in one embodiment of the present disclosure, the measuring part 190 determines that it is a constrained state. When the constrained state is recognized, the sub-motor 120 is driven to rotate the sub-frame 300. The position of the sub-wheel 150 is changed according to the rotation of the sub-frame 300, and the height of the sub-wheel 150 is lower than that of the main wheel 160 with respect to a floor surface. Accordingly, it is possible to escape from the constrained state by a sufficient grip force of the sub-wheel 150.

It will be apparent to those skilled in the art that various modifications and variations can be made in the present application without departing from the spirit or scope of the inventions. Thus, it is intended that the present application covers the modifications and variations of this invention provided they come within the scope of the appended claims and their equivalents.

What is claimed is:

1. A robot cleaner, comprising:
a body defining an exterior;
a main wheel moving the body;
a main motor providing a driving force to the main wheel;
a rotation shaft receiving the driving force from the main motor to rotate the main wheel;
a main frame having one side coupled to the main motor and the other side penetrated by the rotation shaft to support the main wheel;
a subframe rotatably coupled to the main frame;
a sub-wheel coupled to the subframe to rotate; and
a sub-motor configured to rotate the subframe to change a position of the sub-wheel.

2. The robot cleaner of claim 1, wherein the main frame comprises a first frame having the main motor connected thereto and a second frame having the main wheel mounted thereon.

3. The robot cleaner of claim 2, further comprising a main connection gear provided between the first frame and the second frame to transmit the driving force of the main motor to the rotation shaft.

4. The robot cleaner of claim 3, further comprising:
a first pulley coupled to the rotation shaft at one side of the subframe;
a second pulley connected to the sub-wheel at the other side of the subframe; and
a belt connecting the first and second pulleys together to transmit the driving force of the main motor to the sub-wheel.

5. The robot cleaner of claim 4, wherein a distance between the first and second pulleys is greater than that between the rotation shaft and an outer circumferential surface of the main wheel.

6. The robot cleaner of claim 2, wherein the sub-motor is mounted on the first frame.

7. The robot cleaner of claim 6, further comprising a sub-connection gear provided in the first frame to rotate the subframe by receiving a driving force from the sub-motor.

8. The robot cleaner of claim 2, further comprising an elastic member coupled to the main frame to provide an elastic restoring force to the main wheel.

9. The robot cleaner of claim 8, wherein the second frame comprises a wheel guide spaced apart from an outer circumferential surface of the main wheel by a prescribed distance and wherein the elastic member is coupled to the wheel guide.

10. The robot cleaner of claim 2, wherein the first frame comprises a motor receiving portion extending from the first frame in a direction away from the second frame to receive the main motor therein.

* * * * *